T. Williams,
Clutch.

N° 36,263.

Patented Aug. 19, 1862.

Witnesses

Inventor
Turner Williams

UNITED STATES PATENT OFFICE.

TURNER WILLIAMS, OF PROVIDENCE, RHODE ISLAND, ASSIGNOR TO HIMSELF AND DAVID HEATON, 2D, OF SAME PLACE.

IMPROVEMENT IN CRANKS FOR DRIVING SEWING-MACHINES AND OTHER MACHINERY.

Specification forming part of Letters Patent No. 36,263, dated August 19, 1862.

*To all whom it may concern:*

Be it known that I, TURNER WILLIAMS, of Providence, in the county of Providence and State of Rhode Island, have invented a new and useful Improvement in Cranks for Driving Sewing-Machines and other Machinery; and I do hereby declare that the following is a full, clear, and exact description of the same, reference being had to the accompanying drawings, making part of this specification, in which—

Figure 3:
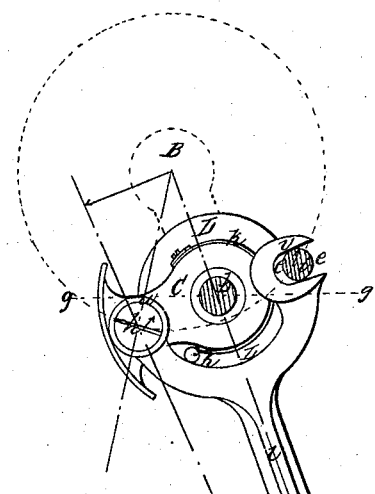
Figure 1:
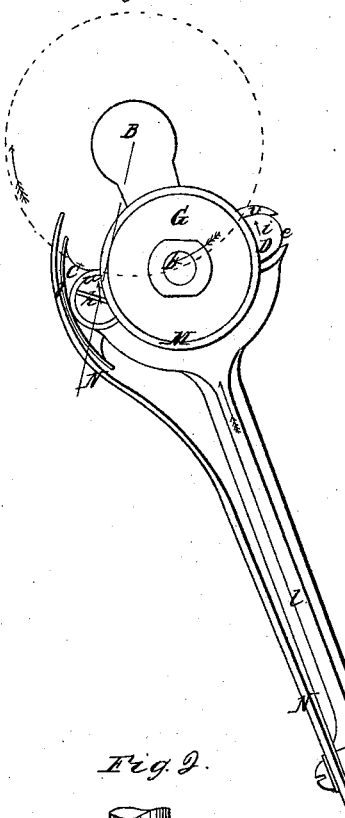
Figure 5:
Figure 9:
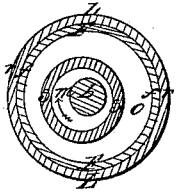
Figure 8:
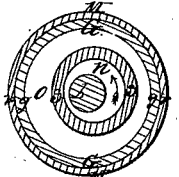
Figure 2:
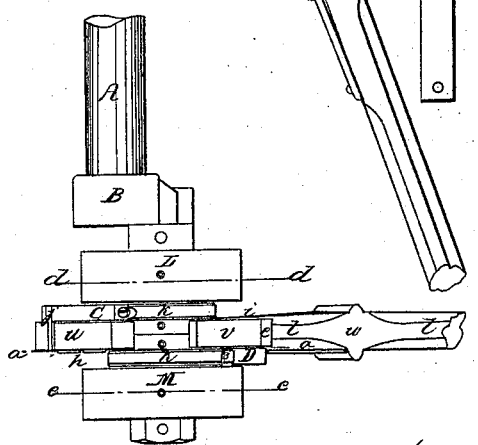
Figure 10:
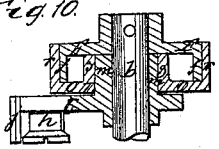
Figure 11:
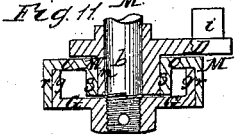

Figure 1 is a front view of my improvement applied to the crank. Fig. 2 is a plan of the same. Fig. 3 is a front view of a section by the line $a\,a$ of Fig. 2. Figs. 4, 5, 6, 7 are details, which are referred to in the course of the description. Fig. 8 is a vertical section by the line $e\,e$ of Fig. 2. Fig. 9 is a vertical section by the line $d\,d$ of Fig. 2. Fig. 10 is a section by the line $g\,g$, Fig. 3. Fig. 11 is a section by the line $k'k$, Fig. 4.

Similar letters of reference denote corresponding parts in all the figures.

The improvement hereinafter described has special reference to the improvement in cranks for driving sewing-machines and other machinery described in the schedule attached to Letters Patent No. 2,723, granted to Turner Williams and David Heaton, 2d, assignees of Turner Williams, under date of November 12, 1861, in which the connecting-rod which connects the treadle with the crank is attached to two auxiliary pins, instead of directly to the crank-pin, and by means of two friction-pawls arranged and operating in connection with the said auxiliary pins and the crank-pin. The auxiliary pins are alternately connected and disconnected to and from the crank-pin, so that the force exerted upon the treadle is exerted upon the advance auxiliary pin, (considering the direction in which the crank is to turn,) instead of directly upon the crank-pin, whereby the crank is made to turn in but one direction, and to entirely avoid stopping upon the "dead-centers" so-called.

My invention in this case is an improvement in the construction and arrangement of the improvement described in the patent above referred to; and it consists, first, in the peculiar construction and arrangement of the friction-pawls with the two auxiliary pins and a crank-pin, for the purpose of connecting and disconnecting the former with the latter alternately at the proper time; second, in the use of a spring-connection or an equivalent yielding force for maintaining the said friction-pawls in their proper position to insure immediate action; third, in the peculiar construction of the connecting-rod which connects the crank with the treadle or other source of motion for attaching the said rod to the said auxiliary pins, so as to operate the two friction-pawls as designed in the act of turning the crank by means of the treadle or other device used; fourth, in the use of a spring, or an equivalent force, in combination with the said connecting-rod, for the purpose of taking up any lost motion and for maintaining the auxiliary pins in their proper position relatively with the crank-pin to insure an immediate action of the pawls.

To enable others skilled in the art to make and use my invention, I will proceed to describe the same.

Figure 6:
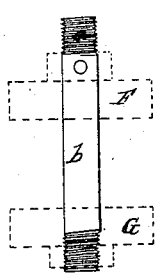

The crank B is formed upon or secured upon one end of the shaft A, Fig. 2. The crank-pin $b$ of the crank I form as shown in Fig. 6, the threaded end $a$ being firmly screwed into the crank. Two flanged wheels, F and G, (shown by transverse sections in Figs. 8, 9, 10, 11,) are firmly secured upon the crank-pin $b$ in the position shown by dotted lines in Fig. 6, by means of pins passing through the hubs of each, as shown, though the wheel G is screwed upon the end of the crank-pin to fix it more securely in such a position. The outer face of the flanges of these wheels $f\,g$ constitutes the regular surface hereinafter mentioned, with which the friction-pawls bind. I arrange with each of these flanged wheels an eccentric, $m$ and $n$, formed upon the arms C and D, and fitted to turn freely upon the crank-pin in the position shown in Figs. 3, 4, 8, 9, 10, 11. The periphery of the eccentrics is irregular with the axis of the crank-pin, and constitutes the irregular surface hereinafter mentioned, with which the friction-pawls bind.

L and M, Figs. 8, 9, 10, 11, are the friction-pawls, consisting of two flanges or rings, $r\,r\,s$ $s$, united by a web or plate, $o$. These are arranged with the wheels F and G and the eccentrics $m$ and $n$, as shown in Figs. 10 and 11, the regular surfaces $f$ and $g$ being fitted to the inner faces of the flanges $r\,r$, and the irregular surfaces $m$ and $n$ being fitted to the inner face of the flanges $s\,s$.

It will be seen that the center of the eccentrics $m$ and $n$ are the axes of the pawls, and the center of the crank-pin $b$ is the common axis of the said eccentrics and the flanged wheels F G, and that in consequence of the axes of the pawls being distinct and removed from the common axis, while the flanges $r\,r$ of the pawls coincide with the flanges $f\,g$ of the wheels F G, as though their axes were common, any change in the relative position of the two axes will tend to change the relative position of the pawls and flanged wheels; but as the connection between the fixed flanges $f$ and $g$ and the flanges $r\,r$ of the pawls prevents this movement, the said flanges only bind with each other, and by this means the eccentric-arm becomes instantly fixed to the crank-pin, and is only released by an opposite movement of the eccentric-arms C and D.

Figure 4:
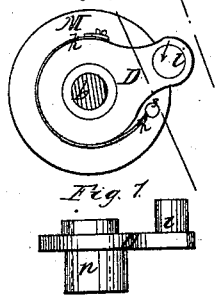
Figure 7:
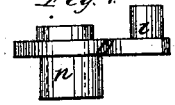

The eccentric-arms C and D extend in opposite directions from the crank-pin, as shown in Figs. 1 and 3, and on being vibrated upon the crank-pin in either direction the pawls are made to bind between their regular and irregular bearings. To properly control this binding action each pawl is connected to its eccentric-arm by means of a flat spring, $k\,k$, one end of each spring being fastened to the arm by a screw, and the other loosely to a pin, 3, projecting from the web $o$ of each pawl, as shown in Figs. 2, 3, and 4, the intention being that each of the pawls shall bind only when its eccentric-arm moves in one given direction, and that relatively the two pawls shall bind when their respective eccentric-arms are moved in the same direction with respect to the crank-pin, so that when the two arms in the position shown in Figs. 1 and 3 are moved upon the crank-pin in opposite directions, as indicated by the arrows at $h\,i$, at the same time, but one of the arms, C, will be connected fixedly with the crank-pin, and that (fixed) one, C, shall be that in advance of the crank-pin in the direction in which the crank is to turn, as indicated by arrows in Fig. 1. To effect this purpose the said springs should be arranged to connect the pawls and arms, as shown in Figs. 2 and 3,—that is, so that the spring as a connection will cause the pawl to move with the arm when the latter is moved in one direction, as indicated by the arrows in Fig. 4 at $i$, and to remain at rest, and, as it were, disconnected from the eccentric-arm, when the latter is moved in an opposite direction, as indicated by arrows in Fig. 3 at $h$, for the purpose of connecting the arm C with the crank-pin by the binding of its pawl.

As the spring-connection $k$ simply overcomes the friction between the faces of the flanges when the arms C and D are moved in one given direction, it is evident that not only the nature and arrangement of the said connection $k$ may be variously modified, but that a weight or other equivalent force may be substituted for the spring-connection and do good service, notwithstanding which I consider the spring-connection preferable on many accounts. It will be seen that with this arrangement of pawls upon the crank-pin of a crank, the connecting-rod or shackle-bar $l$ is attached to two pins, $h\,i$, projecting from the arms C D instead of directly to the crank-pin $b$, as formerly practiced, in consequence of which arrangement each movement of the treadle produces the binding action of the pawl connecting the advance pin with the crank-pin, which is thus made auxiliary to and for the time to perform the function of a crank-pin in assisting such pin to pass the "dead-point" or dead-center, and in directing the force of the treadle.

The connecting-rod $l$ is, for the purpose of its attachment in the peculiar manner shown and described, formed at its upper end, as shown in Figs. 1 and 3, with two ends, $u$ and $v$, one of which, $u$, is connected by a screw-pin, $h$, to the arm C, and the other end, $v$, being formed with an elongated opening, $e$, which embraces a fixed pin, $i$, on the eccentric-arm D, the said pin $i$ having a sliding movement in the said opening, occasioned by the two arms C D moving in opposite directions upon the crank-pin. This construction of the connecting-rod $l$ obviates the necessity of two rods, or of a forked rod with a spring end, $f$, as employed in the case above referred to.

To insure immediate action the eccentric-arms C D should, while at rest, be maintained in the position shown in Figs. 1 and 3—that is, in line with the crank-pin, upon opposite sides thereof. To effect this purpose I make use of the flat spring N, fastened to the rod $l$ by a screw at $w$, with its upper curved end bearing against the face of the segment $j$, formed upon the arm C to receive it. This spring takes up any "lost motion" or slackness in the working parts, and enables such parts to act instantly with each impulse of the treadle.

Having thus described my invention, I wish it understood that I do not claim, broadly, the friction-pawls L M, the same having been previously patented by me the said Turner Williams, under date of September 5, 1860, in Letters Patent No. 645, the invention in this case being confined to the peculiar construction and arrangement of the said pawls herein described.

What I claim as my invention, and desire to secure by Letters Patent, is—

1. The construction and arrangement of the friction-pawls L M, substantially as herein shown and described, for the purpose specified.

2. The use of a spring-connection, $k$, or an equivalent yielding force, arranged and operating substantially as described, for the purpose specified.

3. The peculiar construction of the connecting-rod $l$, substantially as herein shown and described.

4. The spring N, in combination with the connecting-rod $l$, substantially as described, for the purpose specified.

TURNER WILLIAMS.

Witnesses:
ISAAC A. BROWNELL,
D. K. HOXSIE.